US009600228B2

(12) United States Patent
Gur et al.

(10) Patent No.: US 9,600,228 B2
(45) Date of Patent: Mar. 21, 2017

(54) ENHANCED SYSTEM AND METHOD FOR STATIC QUERY GENERATION AND ENTRY

(71) Applicant: HERE Global B.V., Veldhoven (NL)

(72) Inventors: Nadav Gur, Palo Alto, CA (US); David Berlin, Tel Aviv (IL); Moshe Shuchman, Tel Aviv (IL); Ofer Melnik, Highland Park, NJ (US); Imri Goldberg, Zur Moshe (IL)

(73) Assignee: HERE Global B.V., Eindhoven (NL)

( * ) Notice: Subject to any disclaimer, the term of this patent is extended or adjusted under 35 U.S.C. 154(b) by 90 days.

(21) Appl. No.: 14/098,051

(22) Filed: Dec. 5, 2013

(65) Prior Publication Data

US 2015/0161291 A1  Jun. 11, 2015

Related U.S. Application Data

(60) Provisional application No. 61/878,477, filed on Sep. 16, 2013.

(51) Int. Cl.
*G06F 3/16* (2006.01)
*G06F 17/30* (2006.01)

(52) U.S. Cl.
CPC ......... *G06F 3/167* (2013.01); *G06F 17/30976* (2013.01); *G06F 17/30994* (2013.01)

(58) Field of Classification Search
CPC .......... G06F 17/3097; G06F 17/3064; G06F 17/30536; G06F 17/30967; G06F 17/30389; G06F 17/30634; G06F 17/30973; G06F 17/30554; G06F 17/30976; G06F 17/30994
USPC ........................................... 707/718
See application file for complete search history.

(56) References Cited

U.S. PATENT DOCUMENTS

| | | | |
|---|---|---|---|
| 6,772,150 B1 * | 8/2004 | Whitman et al. | 707/721 |
| 7,636,714 B1 * | 12/2009 | Lamping et al. | |
| 7,953,746 B1 * | 5/2011 | Garg et al. | 707/762 |
| 8,392,441 B1 * | 3/2013 | Papachristou et al. | 707/759 |
| 8,798,988 B1 * | 8/2014 | Upstill et al. | 704/9 |
| 2010/0114929 A1 * | 5/2010 | Bonchi et al. | 707/759 |
| 2011/0125743 A1 * | 5/2011 | Immonen et al. | 707/737 |
| 2011/0125744 A1 * | 5/2011 | Immonen et al. | 707/737 |
| 2011/0213655 A1 * | 9/2011 | Henkin et al. | 705/14.49 |
| 2013/0086067 A1 * | 4/2013 | Khoussainova et al. | 707/737 |
| 2013/0226935 A1 * | 8/2013 | Bai et al. | 707/748 |
| 2014/0280297 A1 * | 9/2014 | Gulli et al. | 707/769 |

* cited by examiner

*Primary Examiner* — Hosain Alam
*Assistant Examiner* — Saba Ahmed
(74) *Attorney, Agent, or Firm* — Lempia Summerfield Katz LLC

(57) ABSTRACT

A system and method for static query generation and input, comprising a set of auto-complete and auto-suggest rules, based on a template derived from at least one of an initial user input and context, is used to elicit a more complete query from said user, said auto-complete and auto-suggest values being offered in the form of widgets that offer a visual indicia receptive for user interaction, and wherein depending on at least one of context and status and user input, more than one such widget may be offered concurrently.

18 Claims, 16 Drawing Sheets

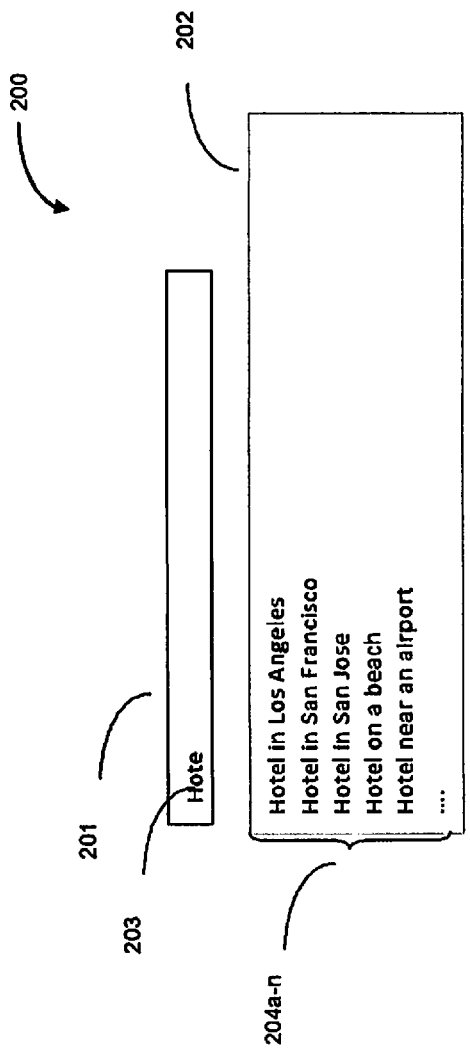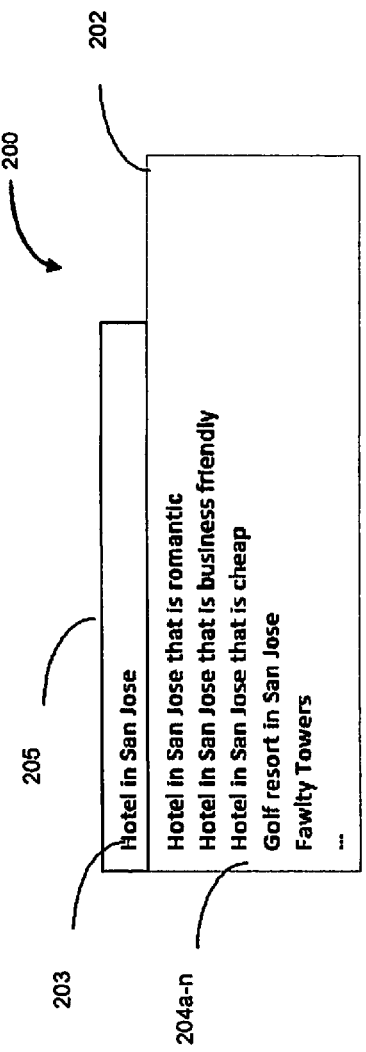
Fig. 2

ENHANCED SYSTEM AND METHOD FOR STATIC QUERY GENERATION AND ENTRY

CROSS-REFERENCE TO RELATED APPLICATIONS

This application claims the benefit of the filing date under 35 U.S.C. §119(e) of U.S. Provisional Application Ser. No. 61/878,477 filed Sep. 16, 2013.

BACKGROUND OF THE INVENTION

1. Field of the Art

The invention is in the field of information search, including Internet search, vertical search, ecommerce related search and similar types of information search. The invention assists end users in forming meaningful and interesting search queries, including natural-language queries, and discovering what type of data is available in the system.

2. Discussion of the State of the Art

Certain computer applications require the user to express themselves in natural language or a subset or simplified version of natural language. Examples of such applications are search engines and computer interactive dialog systems. Natural language as an interface has its advantages and disadvantages. The main advantage is that if it is utilized to its maximal potential a system based on natural language enables the user to express most anything that a human being is able to express. However, it is this open ended flexibility that also poses problems with these kinds of interfaces. In a regular graphical user interface (UI) a user is usually able to ascertain what functionality is available to them by exploring the different visual components of the UI (the menus, buttons, etc). In contrast in a natural language system the user does not have context clues to let them know what functionality is available to them. This poses a fundamental problem as the user is expected to know a priori what functionality is available and to be able and formulate natural language that the system "understands" to access the functionality.

Certain technological aids have been developed to facilitate this process. One such approach is auto complete. In auto complete as a user enters text the system responds by offering possible completions to what they have typed so far. This addresses part of the problem, leading the user to system valid phrases and shortening their time typing. While auto complete is useful for what it does it does not help with fundamental exploration problem. The user is still expected to have an understanding of what options are generally available to them and auto complete makes it easier to get to those options. Furthermore, given an external context the user does not know which queries actually generate relevant results; for instance a search for "romantic French restaurant" in one city may produce many results, but may not produce any in another city, etc.

An additional problem is related to the entry of specific, quantitative information, like dates, prices, no. of units, etc. This type of interaction is in easier and less error-prone by selecting from a visual representation (e.g., calendar, bar chart) than by entering natural language.

An additional problem relates to the completeness of forming a query. Some queries are only relevant if a certain set of values was expressed. Often end-users have a hard time realizing what data is required and what additional data is helpful. For instance consider a hotel search—a query without dates is often of little value as the dates define the availability (hence the set of relevant hotels) and the prices.

What is needed is an enhanced UI that combines the flexibility of natural language with the context and exploration ability of a graphical user interface.

SUMMARY OF THE INVENTION

Accordingly, the inventor has conceived and reduced to practice, in a preferred embodiment of the invention, an enhanced system and method for static query generation and entry. The principle behind this idea is the use of templates. A template is a way of defining the structure of a variety of system-legal phrases. An example of a simple template is a fill-in-the-blank phrase. For example, "A hotel in _____ for _____ between _____ and _____ under $_____." is a template for a natural-language travel query that can be described this way "A <type> in <location> for <people> between <dates> under <price>," where the names tagged <tag> are fields.

This is a simple template example, but a template could potentially be any way of describing the structure of natural language phrases, including but not limited to any of the models in formal language theory (regular grammars, context-free, etc.) through probabilistic and combinatorial language models and more. The templates might be static, being fixed in advance, or they could be dynamic and generated on the fly, incorporating any additional information that is available to the system, as discussed below.

How does the UI work? The user can start in a number of ways. They can begin by being given a graphical representation of a starting template; by selecting an initial template to work with; or by starting to type and having the system suggest potential templates. This template is displayed as a mixture of fixed natural language and graphical elements for the dynamic parts of the template. The dynamic parts enable the user to explore possible completions (through some type of menu) or enter their own valid text. Thus, the user, when exposed to such a template, has the ability to formulate valid phrases, but, more importantly, to explore the variety of valid phrases and learn about the functionality of the underlying system.

FIG. 1 shows an exemplary fill-in-the-blank template 100, in which the user has fixed and dynamic elements to play with. Here the user can manipulate dialers 101a-101f to see the different options that fulfill this particular template and generate interesting natural language phrases that the system supports. The template approach allows a great deal of flexibility in the UI.

The fill-in-the-blank example shown in FIG. 1 indicates a fixed-structure template where only particular parts of the phrase may be changed, but the phrase always consists of five words with a general meaning. The use of more general templates, however, offers the user more expressiveness. Consider the phrase "Brunch in Carmel for couples" as constructed in FIG. 1. However, in a template with optional parts and additional parts, the user might opt to take off the "for couples" part of the phrase, allowing a more general search phrase, or the user could add "that is Italian" to the end of the phrase to narrow the meaning. From a user interface perspective all that is needed for this greater expressiveness are typical user interface elements to add and remove components (e.g., a "+" button that by which the system can suggest a longer template with more fields). Like the dynamic portions of the basic template, in these broader templates the addition of new components can also be done with something that displays the available options to the user and enables them to play and interact. For example, the user might toggle between different template addition options and visually see how it changes the phrase and its possibilities. In addition, the underlying logic of the template might be such that the user changing a UI element would cause additional elements be added and removed. For example, consider a template that can generate the phrase "A Hotel in Santa Cruz near the beach." If the user through the UI changes "Santa Cruz" to "Las Vegas" the template might change to remove the "near the beach" option of the phrase, and optionally it may add new phrase completion options such as "on the Strip." Note that these changes can happen at any part of the template; that is, a user change anywhere can affect the structure and content of any other parts of the template. Thus, by manipulating the UI the user controls two types of aspects: 1) the template, which implies which fields and UI elements are available, 2) the values, which may be selected by the user for each field.

As described above, in a fixed template the UI is directly implied from the template. However, as mentioned above, templates can be dynamic and take into account other considerations as well. At every stage in this interaction, the template, its content and how its content is ordered and prioritized may be built using a combination of factors. For instance, a search based on categories and attributes may include these factors:

A pre-existing category or attribute structure such as, for example, a list of categories of attractions and their features that is based on a semantic domain model (for instance an ontology) of the search data Contextual information such as the location, weather, current and previous activities of the user, current trending activities of other users in the same location, and more. These data can be used alongside a set of rules and/or statistical data about how they apply to the categories and features. An example rule may be "if it's snowing, ski is more relevant." These rules can apply to the suggested elements of the template.

User profile information, such as user preferences, search history, and social graph, which may be used to assess the probability of interest in a category or feature. Example information may include such data as "the user's friends like skiing; show ski first." Any such prioritization approach can employ user information that the system believes is most likely to generate a user response or realize a greater profit.

Actual search database content to assess the availability and desirability of results under possible templates in real time and suggest elements of templates that produce meaningful and/or diverse and/or interesting results. A simple example: if no attractions are available at a selected location, avoid suggesting that the user search for attractions by not suggesting "attractions" as a template element.

The context may also be external criteria. For example, certain items may be emphasized because they are part of a sponsorship/advertising campaign or because internally the system is trying to gather statistics and purposely varying items to gather useful interaction statistics.

The UI template mechanism can also be made broader. While the user interface described above is based on individual templates, the system typically has language that is spanned by different templates or language formalisms. The above user interface can also be expanded to enable the user to "move" between templates. Take the above example of FIG. 1 again: "Brunch in Carmel for couples." The system could be designed such that the user may switch the word "Brunch" for "Motel." In this case there may be an overlap at the end of the sentence between a template for dining and a template for accommodations. By changing that word the system implicitly would change the template in which the user is working to another one. In broad terms the UI can also encapsulate mappings between templates. If the syntactic relationship between templates is known, then the UI could be designed so that by changing, adding, deleting, or choosing elements the user can move from template to template and explore more and more of the functionality of the system, while consistently generating valid language.

In addition, all the UI elements may sit in a type of text box. The user may be able to manipulate the UI elements as described above and in addition the user can manually edit text surrounding the elements or replace elements with the user's own text. In this case, as the user types if the system recognizes that what the user has created is part of a valid template it can transform the typed text into the relevant UI for that template, enabling the user to naturally augment and modify the phrase using the abilities listed previously. The user can then choose to manipulate the UI or do further typing to get other results.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

FIG. 2 is an illustration of a variety of exemplary input user interfaces.

DETAILED DESCRIPTION

Figure 1:
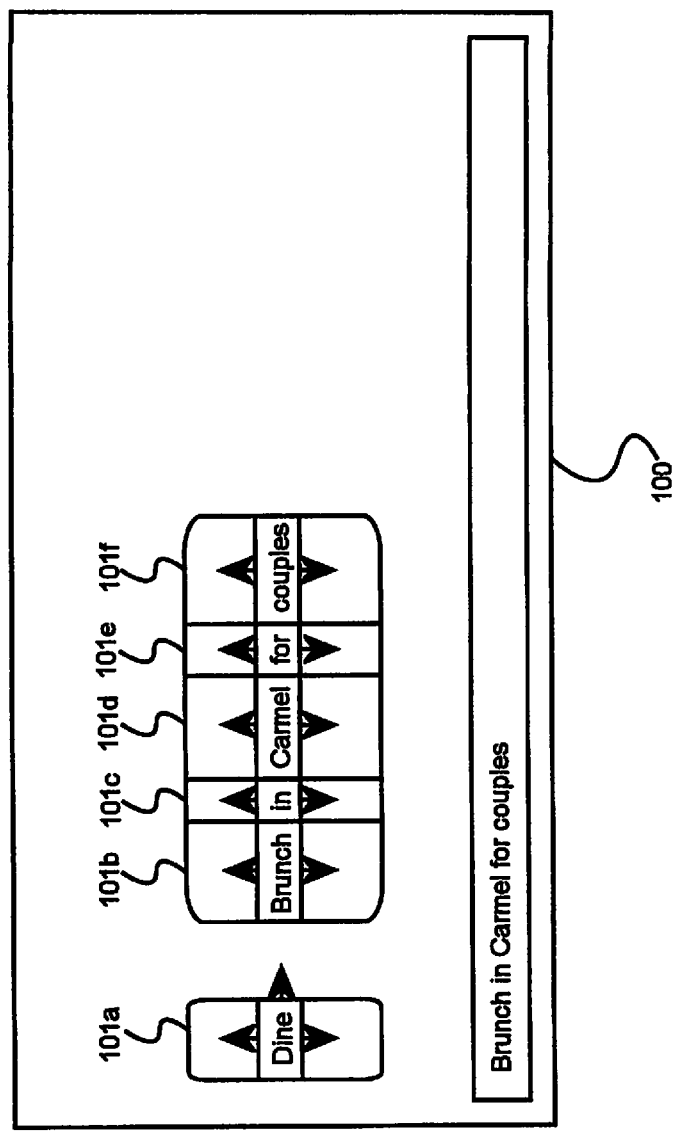
FIG. 1 is an illustration of an exemplary template field-based user interface, according to an embodiment of the invention.

Accordingly, the inventor has conceived and reduced to practice, in a preferred embodiment of the invention, an enhanced system and method for static query generation and entry.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Figure 13:
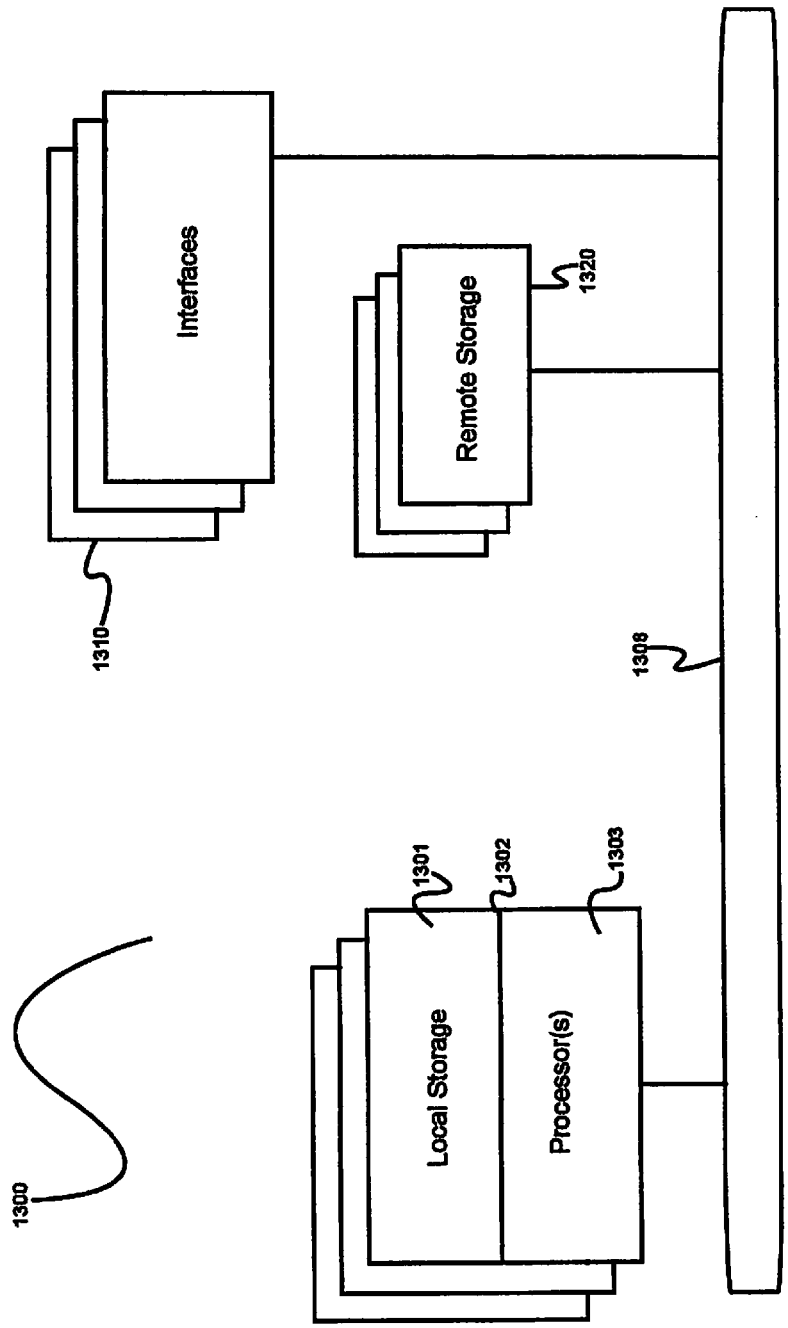
FIG. 13 is a block diagram illustrating an exemplary hardware architecture of a computing device used in an embodiment of the invention.

Referring now to FIG. 13, there is shown a block diagram depicting an exemplary computing device 1300 suitable for implementing at least a portion of the features or functionalities disclosed herein. Computing device 1300 may be, for example, any one of the computing machines listed in the previous paragraph, or indeed any other electronic device capable of executing software- or hardware-based instructions according to one or more programs stored in memory. Computing device 1300 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 1300 includes one or more central processing units (CPU) 1302, one or more interfaces 1310, and one or more busses 1306 (such as a peripheral component interconnect (PCI) bus). When acting under the control of appropriate software or firmware, CPU 1302 may be responsible for implementing specific functions associated with the functions of a specifically configured computing device or machine. For example, in at least one embodiment, a computing device 1300 may be configured or designed to function as a server system utilizing CPU 1302, local memory 1301 and/or remote memory 1320, and interface(s) 1310. In at least one embodiment, CPU 1302 may be caused to perform one or more of the different types of functions and/or operations under the control of software modules or components, which for example, may include an operating system and any appropriate applications software, drivers, and the like.

CPU 1302 may include one or more processors 1303 such as, for example, a processor from one of the Intel, ARM, Qualcomm, and AMD families of microprocessors. In some embodiments, processors 1303 may include specially designed hardware such as application-specific integrated circuits (ASICs), electrically erasable programmable read-only memories (EEPROMs), field-programmable gate arrays (FPGAs), and so forth, for controlling operations of computing device 1300. In a specific embodiment, a local memory 1301 (such as non-volatile random access memory (RAM) and/or read-only memory (ROM), including for example one or more levels of cached memory) may also form part of CPU 1302. However, there are many different ways in which memory may be coupled to system 1300. Memory 1301 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 1310 are provided as network interface cards (NICs). Generally, NICs control the sending and receiving of data packets over a computer network; other types of interfaces 1310 may for example support other peripherals used with computing device 1300. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™ near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some in stances, volatile and/or non-volatile memory (e.g., RAM).

Although the system shown in FIG. 13 illustrates one specific architecture for a computing device 1300 for implementing one or more of the inventions described herein, it is by no means the only device architecture on which at least a portion of the features and techniques described herein may be implemented. For example, architectures having one or any number of processors 1303 may be used, and such processors 1303 may be present in a single device or distributed among any number of devices. In one embodiment, a single processor 1303 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 1320 and local memory 1301) configured to store data, program instructions for the general-purpose network operations, or other information relating to the functionality of the embodiments described herein (or any combinations of the above). Program instructions may control execution of or comprise an operating system and/or one or more applications, for example. Memory 1320 or memories 1301, 1320 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 14:
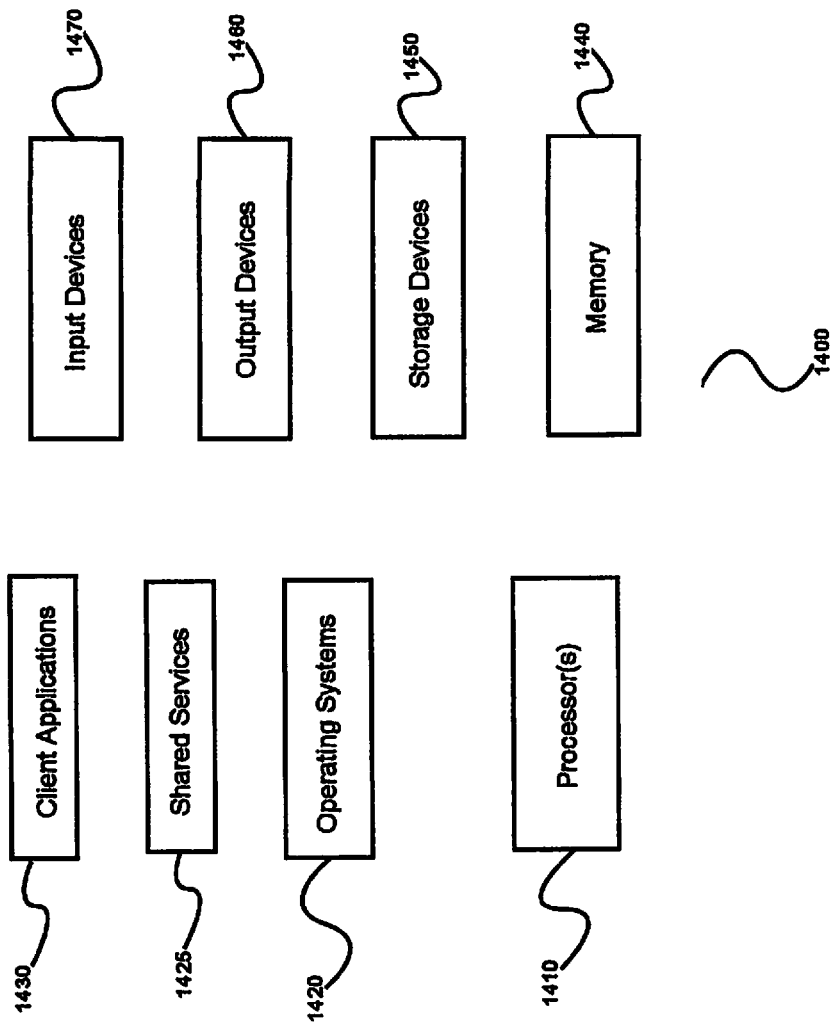
FIG. 14 is a block diagram illustrating an exemplary logical architecture for a client device, according to an embodiment of the invention.

In some embodiments, systems according to the present invention may be implemented on a standalone computing system. Referring now to FIG. 14, there is shown a block diagram depicting a typical exemplary architecture of one or more embodiments or components thereof on a standalone computing system. Computing device 1400 includes processors 1410 that may run software that carry out one or more functions or applications of embodiments of the invention, such as for example a client application 1430. Processors 1410 may carry out computing instructions under control of an operating system 1420 such as, for example, a version of Microsoft's Windows™ operating system, Apple's Mac OS/X or iOS operating systems, some variety of the Linux operating system, Google's Android™ operating system, or the like. In many cases, one or more shared services 1425 may be operable in system 1400, and may be useful for providing common services to client applications 1430. Services 1425 may for example be Windows™ services, user-space common services in a Linux environment, or any other type of common service architecture used with operating system 1410. Input devices 1470 may be of any type suitable for receiving user input, including for example a keyboard, touchscreen, microphone (for example, for voice input), mouse, touchpad, trackball, or any combination thereof. Output devices 1460 may be of any type suitable for providing output to one or more users, whether remote or local to system 1400, and may include for example one or more screens for visual output, speakers, printers, or any combination thereof. Memory 1440 may be random-access memory having any structure and architecture known in the art, for use by processors 1410, for example to run software. Storage devices 1450 may be any magnetic, optical, mechanical, memristor, or electrical storage device for storage of data in digital form. Examples of storage devices 1450 include flash memory, magnetic hard drive, CD-ROM, and/or the like.

Figure 15:
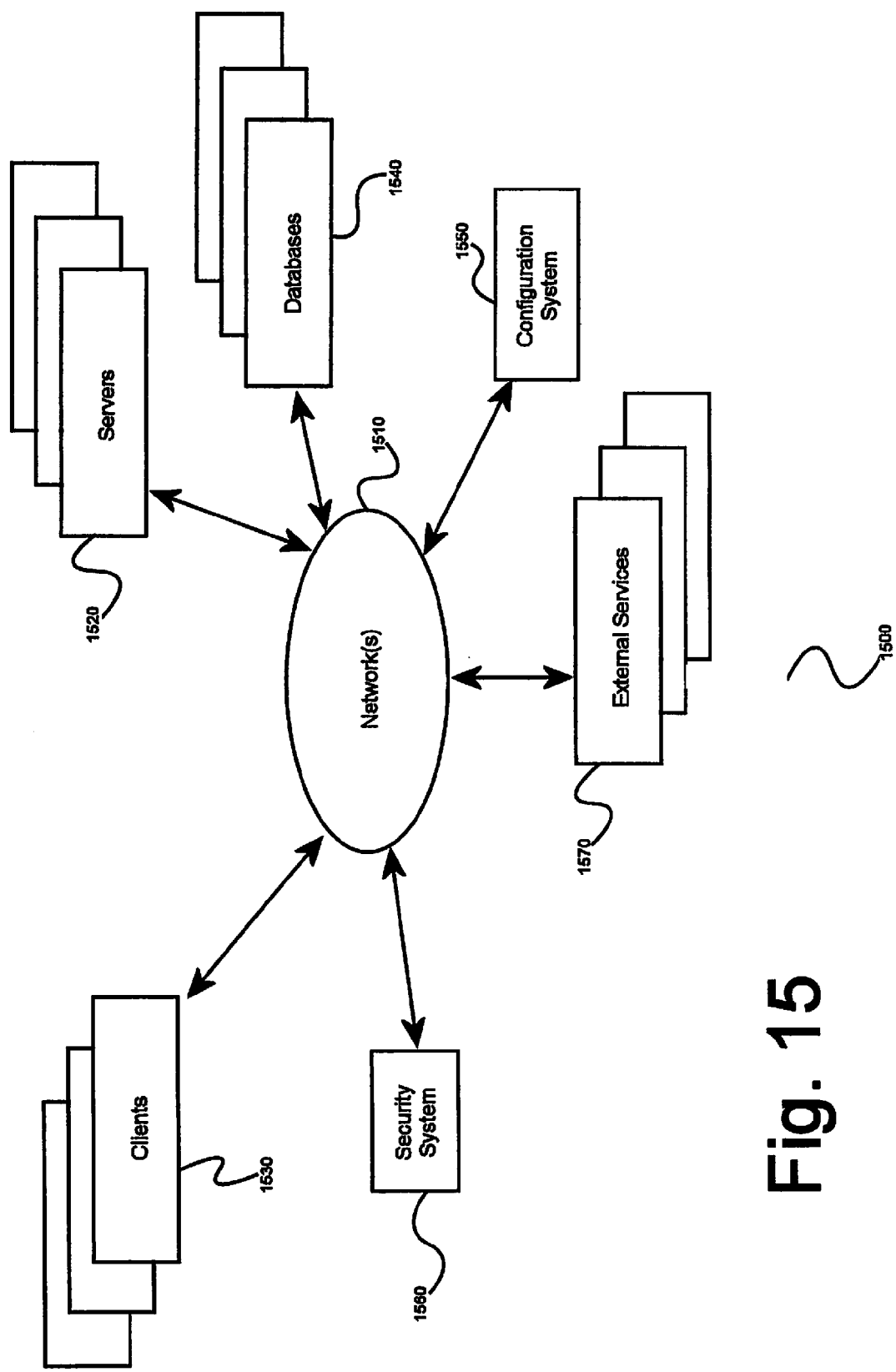
FIG. 15 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 15, there is shown a block diagram depicting an exemplary architecture 1500 for implementing at least a portion of a system according to an embodiment of the invention on a distributed computing network. According to the embodiment, any number of clients 1530 may be provided. Each client 1530 may run software for implementing client-side portions of the present invention; clients may comprise a system 1500 such as that illustrated in FIG. 14. In addition, any number of servers 1520 may be provided for handling requests received from one or more clients 1530. Clients 1530 and servers 1520 may communicate with one another via one or more electronic networks 1510, which may be in various embodiments any of the Internet, a wide area network, a mobile telephony network, a wireless network (such as WiFi, Wimax, and so forth), or a local area network (or indeed any network topology known in the art; the invention does not prefer any one network topology over any other). Networks 1510 may be implemented using any known network protocols, including for example wired and/or wireless protocols.

In addition, in some embodiments, servers 1520 may call external services 1570 when needed to obtain additional information, or to refer to additional data concerning a particular call. Communications with external services 1570 may take place, for example, via one or more networks 1510. In various embodiments, external services 1570 may comprise web-enabled services or functionality related to or installed on the hardware device itself. For example, in an embodiment where client applications 1430 are implemented on a smartphone or other electronic device, client applications 1430 may obtain information stored in a server system 1520 in the cloud or on an external service 1570 deployed on one or more of a particular enterprise's or user's premises.

In some embodiments of the invention, clients 1530 or servers 1520 (or both) may make use of one or more specialized services or appliances that may be deployed locally or remotely across one or more networks 1510. For example, one or more databases 1540 may be used or referred to by one or more embodiments of the invention. It should be understood by one having ordinary skill in the art that databases 1540 may be arranged in a wide variety of architectures and using a wide variety of data access and manipulation means. For example, in various embodiments one or more databases 1540 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 1560 and configuration systems 1550. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 1560 or configuration system 1550 or approach is specifically required by the description of any specific embodiment.

Figure 16:
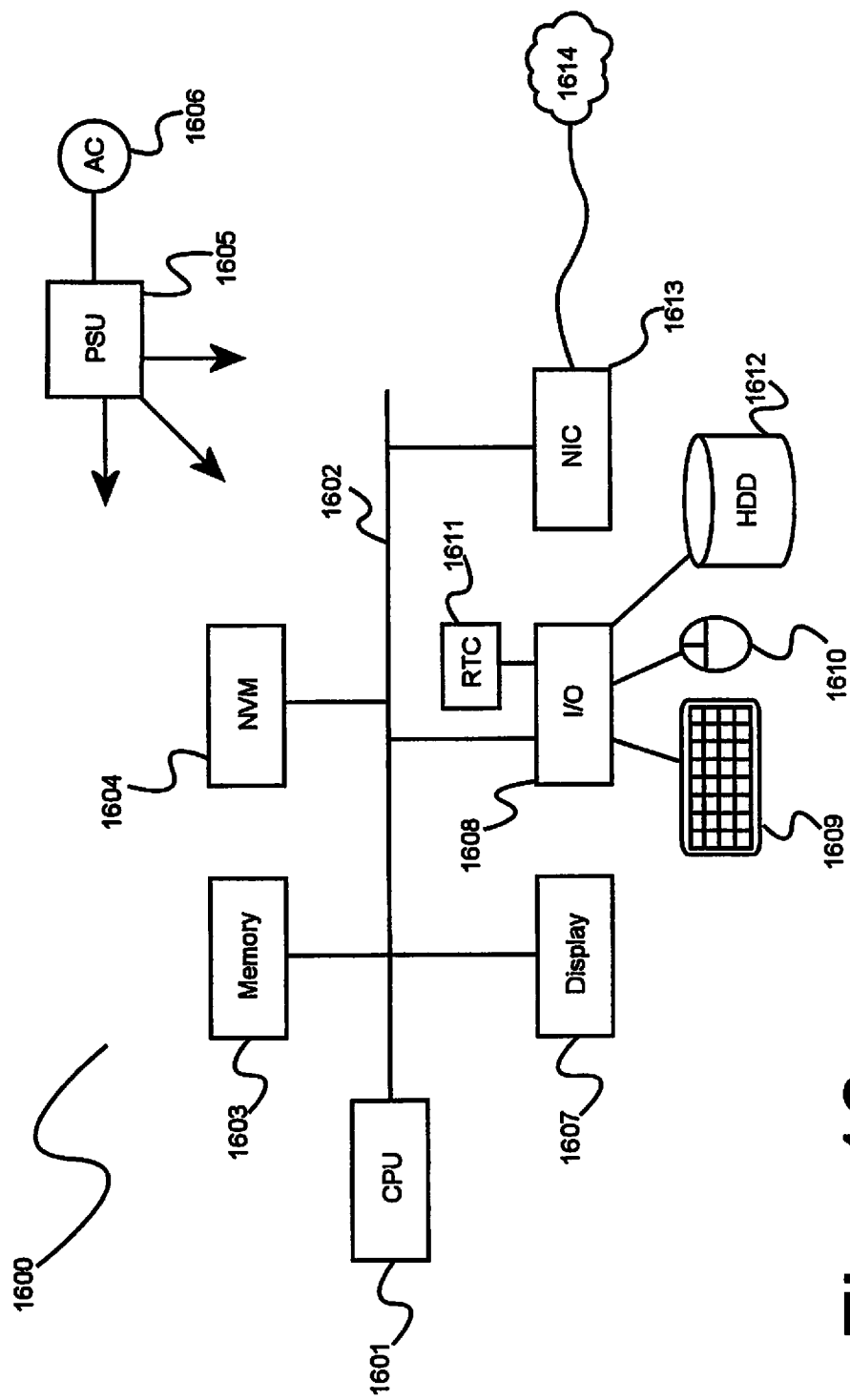
FIG. 16 is another block diagram illustrating an exemplary hardware architecture of a computing device used in various embodiments of the invention.

FIG. 16 shows an exemplary overview of a computer system 1600 as may be used in any of the various locations throughout the system. It is exemplary of any computer that may execute code to process data. Various modifications and changes may be made to computer system 1600 without departing from the broader spirit and scope of the system and method disclosed herein. CPU 1601 is connected to bus 1602, to which bus is also connected memory 1603, non-volatile memory 1604, display 1607, I/O unit 1608, and network interface card (NIC) 1613. I/O unit 1608 may, typically, be connected to keyboard 1609, pointing device 1610, hard disk 1612, and real-time clock 1611. NIC 1613 connects to network 1614, which may be the Internet or a local network, which local network may or may not have connections to the Internet. Also shown as part of system 1600 is power supply unit 1605 connected, in this example, to ac supply 1606. Not shown are batteries that could be present, and many other devices and modifications that are well known but are not applicable to the specific novel functions of the current system and method disclosed herein.

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

FIG. 1 shows an exemplary fill-in-the-blank template 100, in which the user has fixed and dynamic elements to play with. Here the user can manipulate dialers 101a-101f to see the different options that fulfill this particular template and generate interesting natural language phrases that the system supports. The template approach allows a great deal of flexibility in the UI.

The fill-in-the-blank example shown in FIG. 1 indicates a fixed-structure template where only particular parts of the phrase may be changed, but the phrase always consists of five words with a general meaning. The use of more general templates, however, offers the user more expressiveness. Consider the phrase "Brunch in Carmel for couples" as constructed in FIG. 1. However, in a template with optional parts and additional parts, the user might opt to take off the "for couples" part of the phrase, allowing a more general search phrase, or the user could add "that is Italian" to the end of the phrase to narrow the meaning. From a user interface perspective all that is needed for this greater expressiveness are typical user interface elements to add and remove components (e.g., a "+" button that by which the system can suggest a longer template with more fields). Like the dynamic portions of the basic template, in these broader templates the addition of new components can also be done with something that displays the available options to the user and enables them to play and interact. For example, the user might toggle between different template addition options and visually see how it changes the phrase and its possibilities. In addition, the underlying logic of the template might be such that the user changing a UI element would cause additional elements be added and removed. For example, consider a template that can generate the phrase "A Hotel in Santa Cruz near the beach." If the user through the UI changes "Santa Cruz" to "Las Vegas" the template might change to remove the "near the beach" option of the phrase, and optionally it may add new phrase completion options such as "on the Strip." Note that these changes can happen at any part of the template; that is, a user change anywhere can affect the structure and content of any other parts of the template. Thus, by manipulating the UI the user controls two types of aspects: 1) the template, which implies which fields and UI elements are available, 2) the values, which may be selected by the user for each field.

DETAILED DESCRIPTION OF EXEMPLARY EMBODIMENTS

Following are a few examples of how the system disclosed herein may be embodied. These are only examples and do not limit the scope of the disclosed embodiment in any way.

Textual Representation

This is one of the simplest implementations, which just uses a search box. As the user is entering/editing text (e.g., using a keyboard or speech), they are presented with suggestions, and the user can select them to be added/replace the text entered. Unlike auto complete that just suggests completions here the suggestions are based on templates and can even replace what was entered. The system notices the templates of which the user's text can be partial manifestations and suggests possible complete phrases, using the templates.

FIGS. 2a and 2b show examples of user-modified templates. In template 200, a portion of which is shown in FIG. 2a, the user is starting to type "Hotel" 203 into template field 201. The system identifies use of a template that starts with Hotel and decides to offer in field 202 phrase completions 204a-n where the next feature that may be interesting is the location, suggesting various options for specific/non-specific locations:

FIG. 2b shows an additional stage in template 200, wherein the user has filled in field 201 with text "Hotel in San Jose" 205. The system may then decide to look at a broader template context and to suggest a theme, or even suggest specific search results that are relevant or otherwise interesting, in list 206 in field 202.

Visual Dialers

Figure 3A:
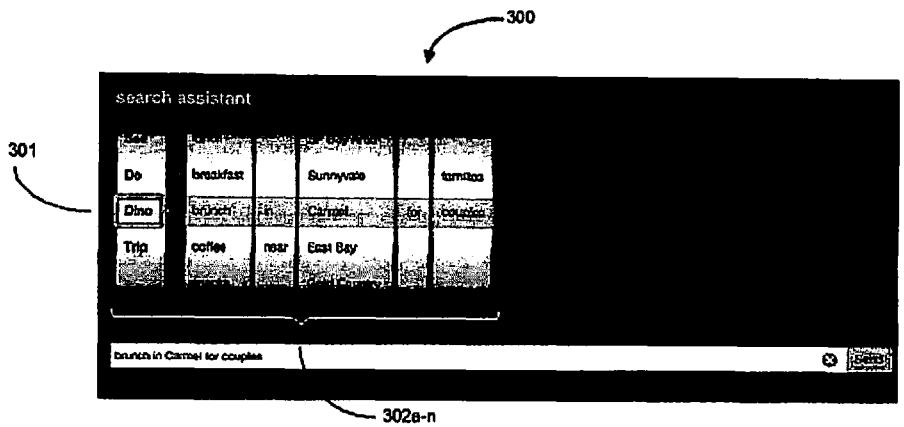
FIG. 3 is an illustration of a variety of exemplary field-based user interfaces.
Figure 3B:
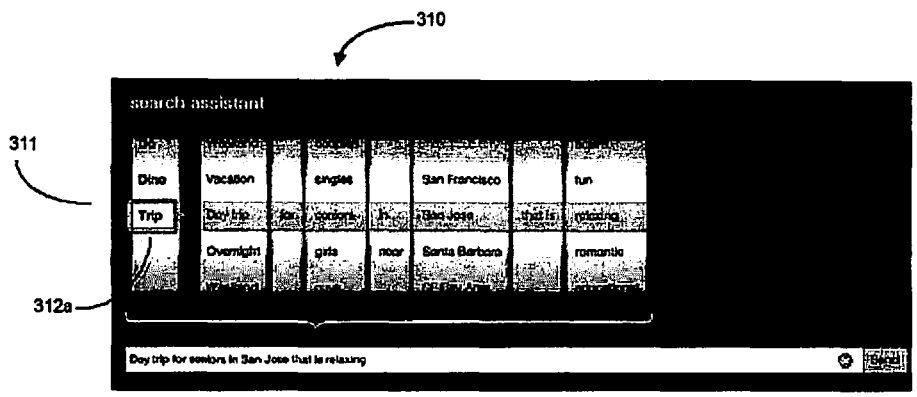
Figure 3C:
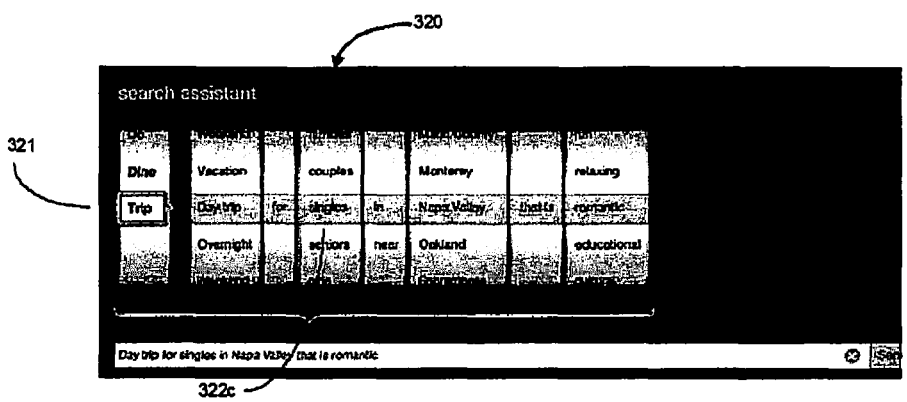

FIGS. 3a, 3b, and 3c show a user interface design that is more effective for touch screens and demonstrates more clearly how the UI informs the user succinctly of the options available. A row of visual "dialer menus" is arranged on the screen as per a template or group of templates. These dialer menus can be manipulated individually. The dialers are used to create phrases or sentences. Selection of a value for a dialer or set of dialers may reset the number and contents of dialers whose value has not yet been set by the user to relevant attributes. Setting the value of dialers may also create a textual phrase or query in a search field.

FIG. 3a shows an exemplary dialer 300 with a query entered in a search field 301, which search field contains categories 302.

FIG. 3b shows an exemplary dialer 310. Changing the first category 312a in search field 311 results in changes in the following categories 312.

FIG. 3c shows an exemplary dialer 320. In this case, changing the third category 322c in results in suggestions of different locations and themes search field 321.

Template Classification

A number of templates can be managed by the software, such that when the user starts interacting—by typing, selecting or speaking—the system classifies the keywords entered by field type, and this way chooses the template the user is following. This approach enables the system to guide the user to phrase his query according to the chosen template. Such guidance can be provided through an "Auto-suggest" mechanism whereby possible field values that match the field type are suggested in a drop-down menu or similar UI widget or through visual or textual cues. For instance, consider an example where there are two templates—one for accommodations search, one for activity search. The Accommodations template could be: <type> in <location> on <dates> for <guests>—e.g., "luxury hotel in New York City on June 1-3 for 2 people." The Activities template could be <type> in <location> featuring <feature>. When a user starts typing, the system could cue the user to enter a type first, by displaying a prompt, such as "What type of place are you looking for?" and auto-suggesting a few places types, such as, for example, "hotel, tour, cruise." Auto-suggestions may be based on the actual content of the result database, statistical history of user queries, known location or intent of the user, etc. If the user enters or selects "motel," for instance, the system understands the Accommodations template should be used and then asks for a location and then for dates. If the user enters "massage," the system asks for location and then for additional features.

Figure 4:
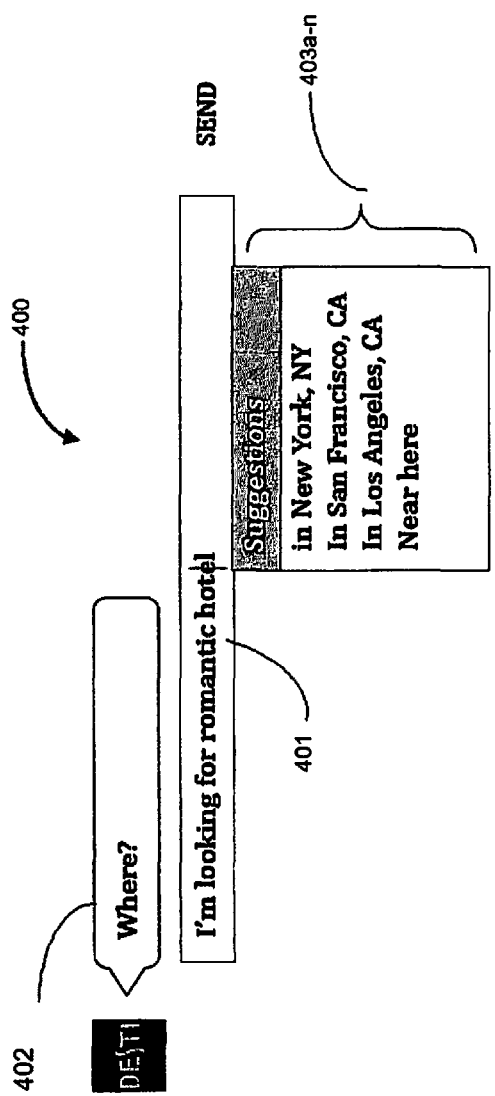
FIG. 4 is an illustration of an exemplary user interface illustrating the system suggesting information based on input cues.

FIG. 4 shows and exemplary user interface 400 in which the system gives a cue and makes suggestions for a location. The user expressed a <type> 401 he is interested in ("romantic hotel") and the system is soliciting the <location>, with both a textual cue 402 ("where?") and auto-suggestions 403.

Such a system could manage many templates through a tree-structure or state machine. It could also include logic for handling inconsistencies, such as when a user does not respond to a specific template cue with matching text. For example, if the user is asked for <guests> and instead types in an amenity he is interested in, the system could understand that as a <feature> field, remember it for a subsequent template field, and ask again about the detail that it's missing. Alternatively the system could choose an alternate template that does include a <feature> field at this stage, etc.

A specific complication exists with fields that are quantitative, such as dates. It is generally easier and less error prone to pick dates from a calendar than enter them using natural language. In a template-driven system, when the system reaches such a field, then instead of just providing a textual cue and/or a list of suggestions, the system could automatically display a visual widget that easily enables the user to pick the quantitative value such as, for example, a calendar widget for dates, a slider widget for prices or distances (perhaps with additional information such as the distribution of prices for rooms in the destination city), etc. Such widgets can also be incorporated in a speech-driven system, so that when the system detects that the user has reached a point in the template where such a value needs to be entered, the visual menu or widget is displayed, and the user may select from the widget instead of speaking the specific quantities, numbers, dates etc.

Figure 5:
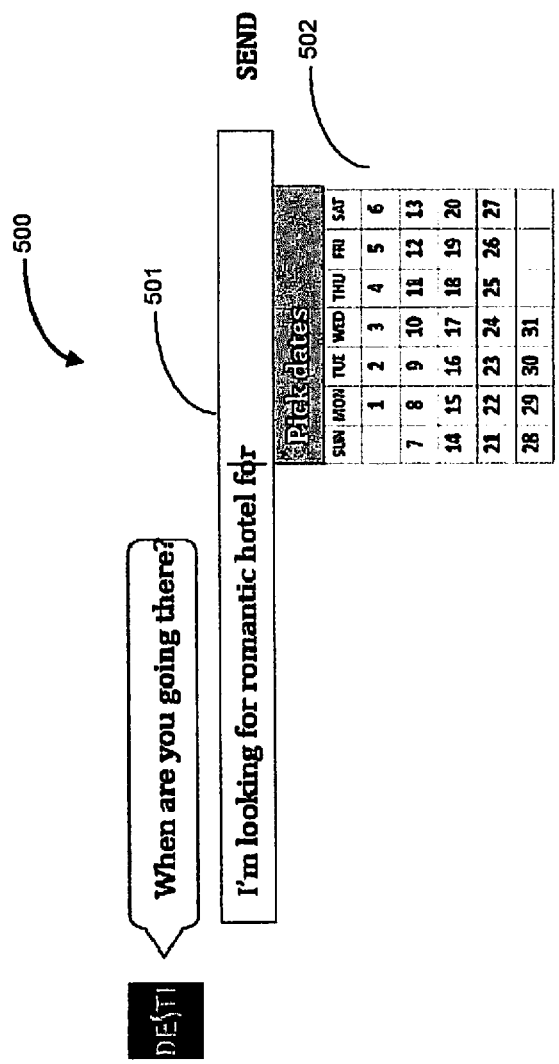
FIG. 5 is a further illustration of an exemplary user interface, illustrating the system soliciting a date entry based on input cues.

FIG. 5 shows an exemplary user interface 500 in which the system is soliciting a date entry to complete the data in text field 501 by displaying a calendar widget 502.

Figure 6:
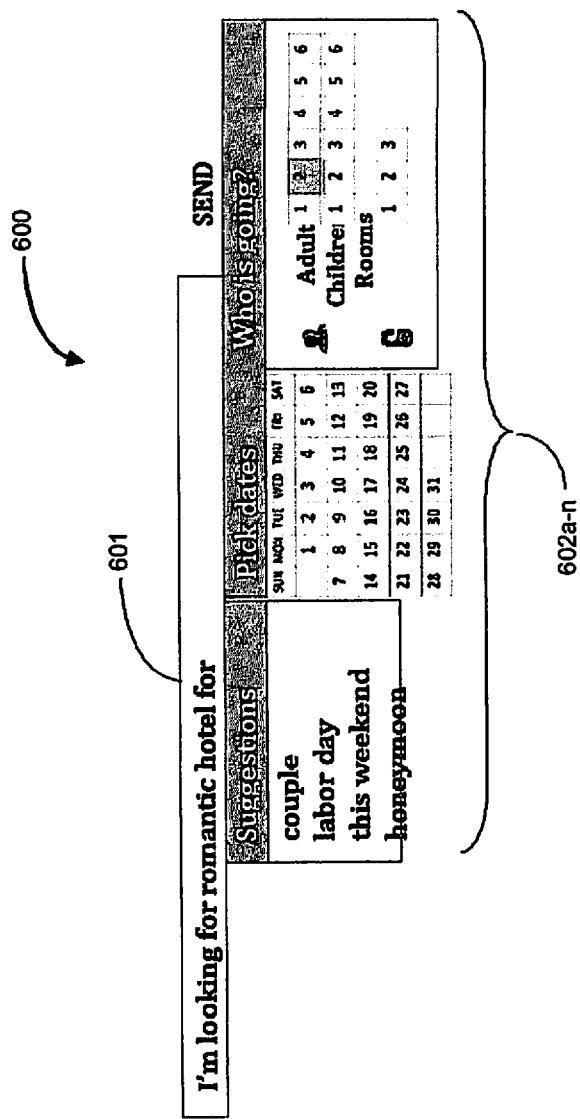
FIG. 6 is an illustration of an exemplary user interface illustrating the use of multiple widgets and menus.

Such auto-suggest and quantitative widget-based entry can be used even in the absence of templates, or when the text entered does not match the templates. FIG. 6 shows an exemplary user interface 600 wherein multiple menus and/or widgets 602 may be displayed when the user's entry seems ambiguous to the system. In this case, the system may use reference words supplied by the user. If the user supplies reference words such as "for," "on," "in," etc., the system can then respond by narrowing down the semantic type of information that the user wishes to express next. For example, in a travel context, if the user types "for," in field 601, the type of data the user may wish to follow this reference word may be any of multiple data types, such as people, dates, or a named time span, e.g., "for a family," "for September 10-12," "for Thanksgiving weekend," etc. Therefore such a reference term can be a trigger for the system to display menus and widgets 602 that enable quick selection of the item desired by the user.

Figure 7:
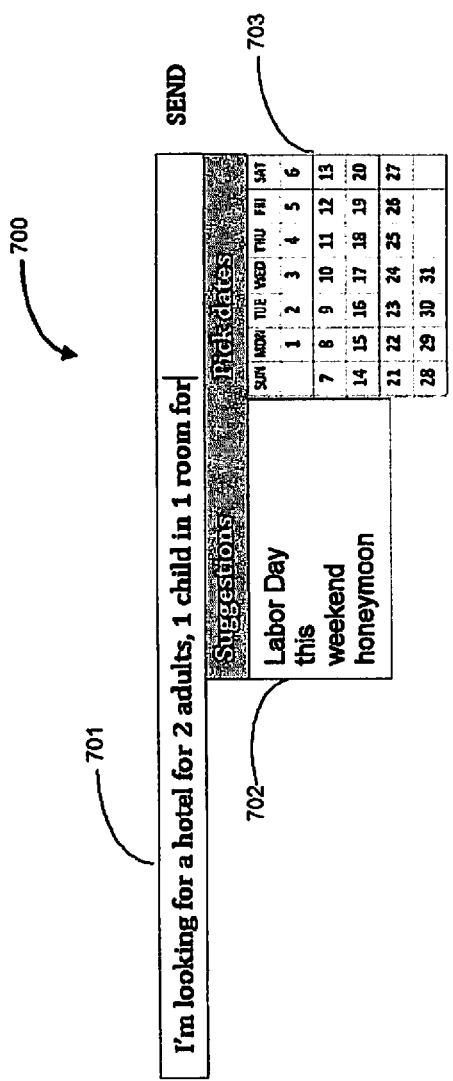
FIG. 7 is a further illustration of an exemplary user interface, illustrating the use of input recognition to reduce repeated entries.

It is also easily understood that such ambiguity can be further reduced through the information already entered by the user, such that if one the fields was already entered, it needn't be suggested again. FIG. 7 shows an exemplary user interface 700. In this example, the first use of the reference word "for" is followed by an accommodation type. Therefore, fewer widgets appear in response to the use of the second "for." In this case, the system offers the user a type-of-occasion menu 702 and a calendar 703.

Figure 8:
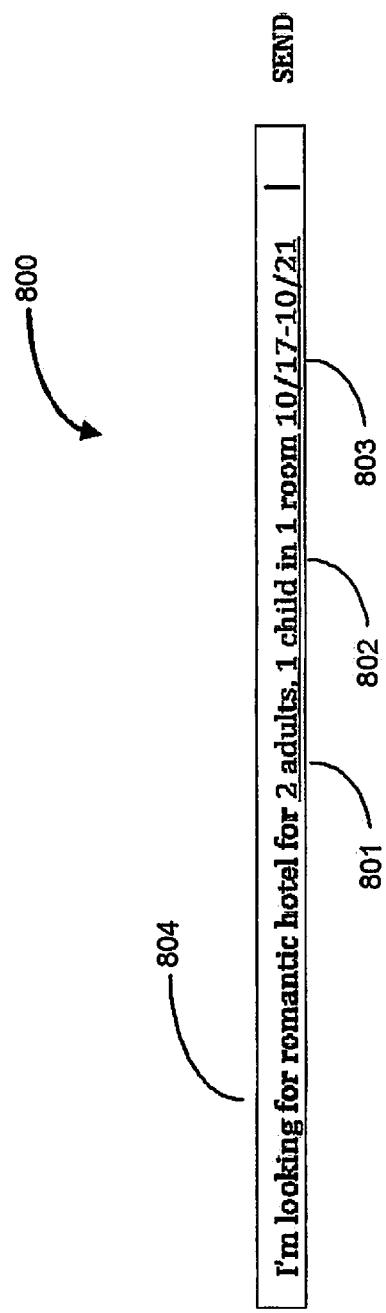
FIG. 8 is a further illustration of an exemplary user interface, illustrating the use of separate interactive tokens.

One way to enable the user to easily change entries could be to annotate the query string itself, such that clicking a specific token re-opens the widget that was used to pick or enter it. FIG. 8 shows an exemplary user interface 800, wherein clicking each of the separately underlined tokens 801, 802, or 803 in field 804 would open the appropriate data entry widget (not shown).

Figure 9A:
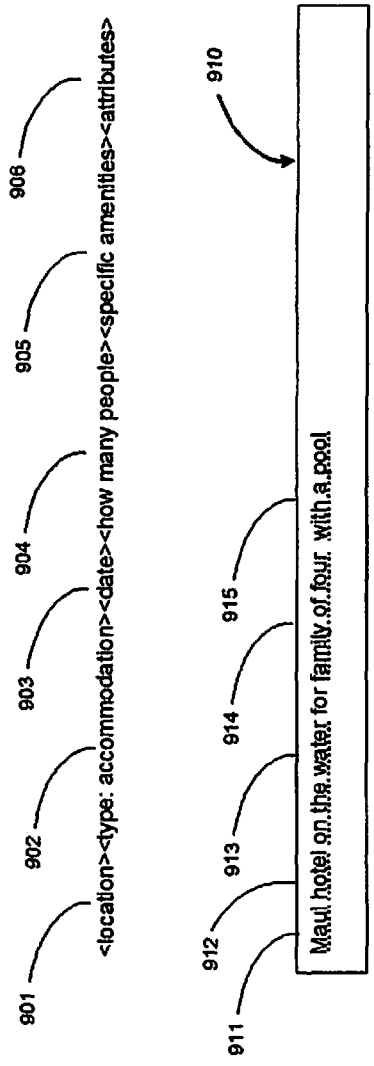
FIG. 9 shows an exemplary overview of a template, with a variety of sample input illustrated.

FIG. 9a shows an exemplary overview of a template 900 with a typical query for a hotel or other destination search. Template 900 contains, in this example, a location 901, type of what the user wants, which is, in this example, an accommodation 902. Other types of what the user wants could be, for example, a landmark, an historical site, etc. A date or date range 903 is included, and then the how many people 904, which may be broken down into adults, children, pets, people with special needs, etc., as shown later. Specific amenities 905, such as, for example, on the beach, with a pool, with golfing privileges, etc. may be included, and also additional attributes 906, which have not been properly planned but may be added by the user ad lib. Box 910 shows an exemplary fill-in by the user. The location is Maui 911; what the user wants is a hotel 912, with on the water 913 an attribute of the hotel. The number of people is a family of four 914 and an amenity is with a pool 915. In this example, the template has been slightly modified on the fly; for example, the date has not yet been entered, and an attribute to the hotel, on the water 912, has been added. Also, certain sections have a dotted underline to indicate to the user that these are interactive sections and when the pointer is placed in a section, user can modify the text in that section.

Figure 9B:
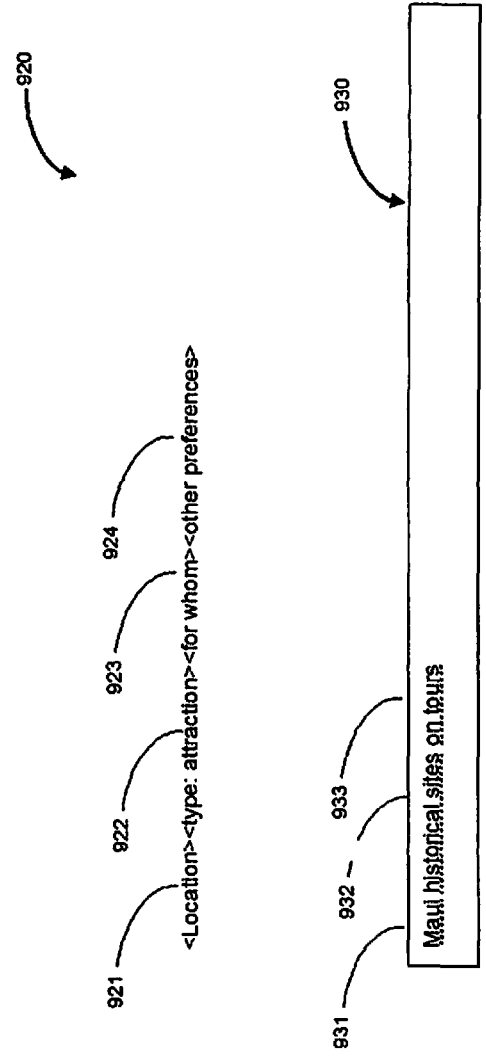

FIG. 9b shows a similar exemplary template 920, in this case, an exemplary template for an attraction. When the user starts typing in window 930 "Maui historical site," the window changes from template 900 to template 920, because a historical site is a type of attraction, rather than a type of accommodation, and it has a different template. However, the user has the ability to make a free-style entry with different words than the words in the template 920.

Figure 10:
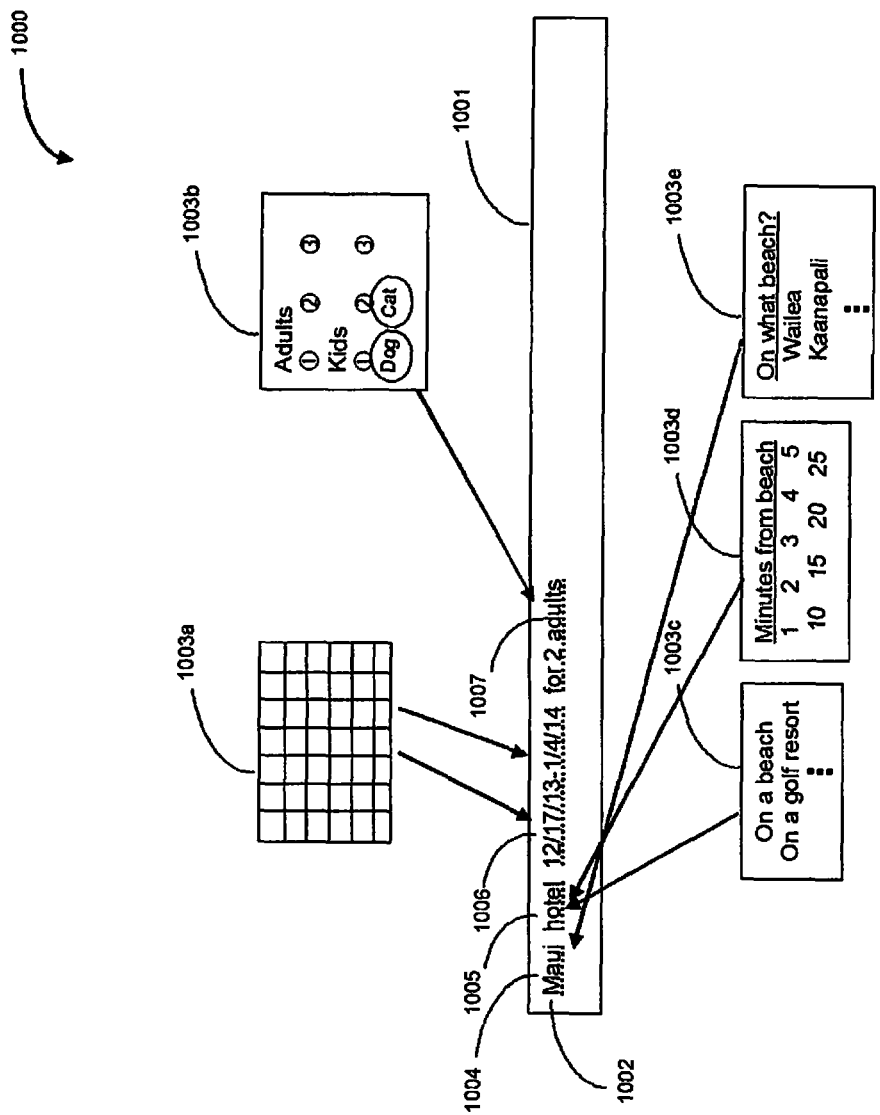
FIG. 10 is an illustration of an exemplary user interaction system when a user is making a query.

FIG. 10 shows an exemplary user interaction system 1000 when a user is making a query 1002 in a box 1001. The query shows, for example, "Maui" 1004 "hotel" 1005. Now when the user specifies "Maui hotel," a widget 1003e can pop up, asking about the desired area or beach and offering suggestions, such as Wailea, Kaanapali, etc. Another attribute widget 1003c may open at the same time, or consequently, offering attributes such as on a beach, on a golf resort, in the mountains, etc. Further, if the user selects, for example, "on a beach," another attribute widget 1003d may pop up, asking for the desired walking time from the beach. Once the user reaches the date section 1006 of the template, a calendar widget 1003a opens in which the user can specify the start and end dates 1006 of the stay. When the user enters "for", or alternatively immediately after the user entered the dates, widget 1003b may pop up, giving the user options to specify the number and characteristics of the occupants, such as, for example, number of adults, number of children, pets (dog, cat), etc, which the user can pick for instance "2 adults" which will add the token 1007 to the sentence. In this way the system can automatically narrow its offerings to accommodations that can satisfy the user's requirements.

The details of the user interaction system 1000 shown in FIG. 10 are exemplary only. Depending on the size of the screen of the device used to enter the query, that is, mobile phone, tablet, PC, etc., the number of widgets that may open simultaneously may be restricted, or the system may offer a small toolbar or a set of tabs, for example, from which the user can select desired widgets or functions for interaction. Many such approaches may be devised, such as, for example, depending on the tab a user selects, a widget opens showing to which sets of words it is linked, by, for example, highlighting linked words in a specific contrasting color. The user can always select a section in a template and, instead of using the options shown in a pop-up widget, the user can type in his own preferences. The widgets are designed to implement an auto-suggestion approach, instead of an auto-complete approach. In auto-complete, as the user types, the text widget that drops down can complete what the user is typing, or can show the user what other people have typed to complete the given section. However, in this case, for example, when the user types a word, such as "hotel," the attribute widget 1003c may pop up, prompting the user to express an attribute preference.

Figure 11:
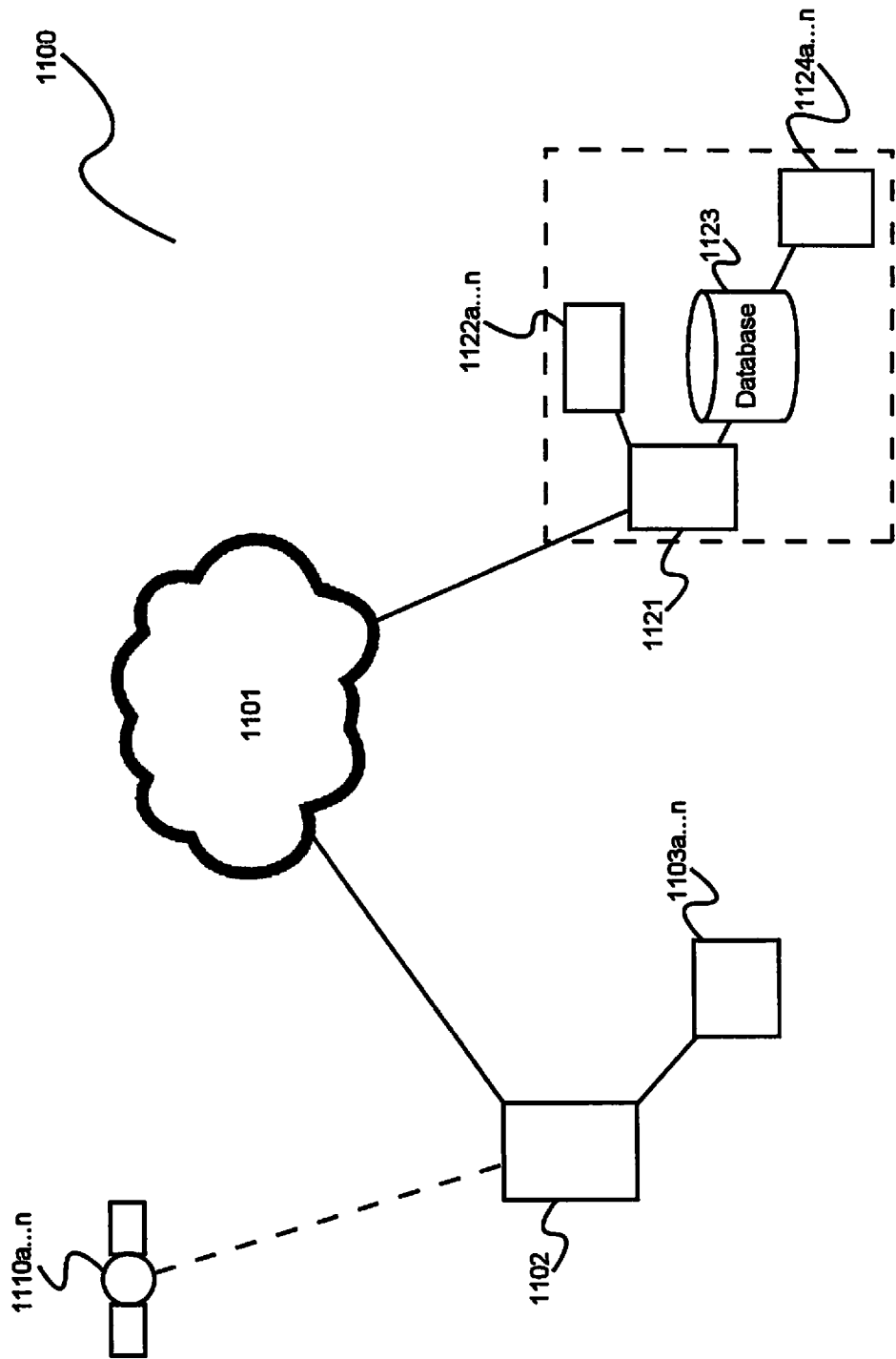
FIG. 11 is an illustration of an overview of an exemplary system according to a preferred embodiment of the invention.

FIG. 11 shows an overview of an exemplary system 1100 according to one aspect of the system and method disclosed herein. Internet 1101 is exemplary of any type of network; any other type of network could be used. Also shown is a mobile computing device 1102, which device could be a tablet, a phone, a cross-over device, a mobile computer, etc. This device 1102 preferably has a GPS function connected to satellites 1110a-n, of which only one is shown for reasons of clarity and simplicity. It also contains multiple software instances 1103a-n, including, but not limited to, an operating system, web browser, etc. In some cases instances 1103a-n may include an application that is part of the system disclosed herein, in other cases the system may execute as a script or applet that is downloaded by the browser when visiting a web site, and in yet other cases even other approaches may be used. All these different approaches may be considered, for purposes of describing the system disclosed herein, as equivalent in functionality. In this example, a download of system software comes from a web server. Web server operation cluster 1120 includes web server 1121, web service software instances 1122a-n, and mass storage device 1123, which contains additional databases and software instances 1124a-n. In some cases, web server operation cluster 1120 may be a single server, located, for example, at an operator's premises. In other cases, it may be a single server in a so-called "co-location" or cloud-based operation; and in yet other cases, it may be a cluster or large group of servers, or multiple servers, or multiple clusters or groups of servers. However, in most cases, cluster 1120 may be set up to appear to the application running on device 1102 as if it were one system.

Figure 12:
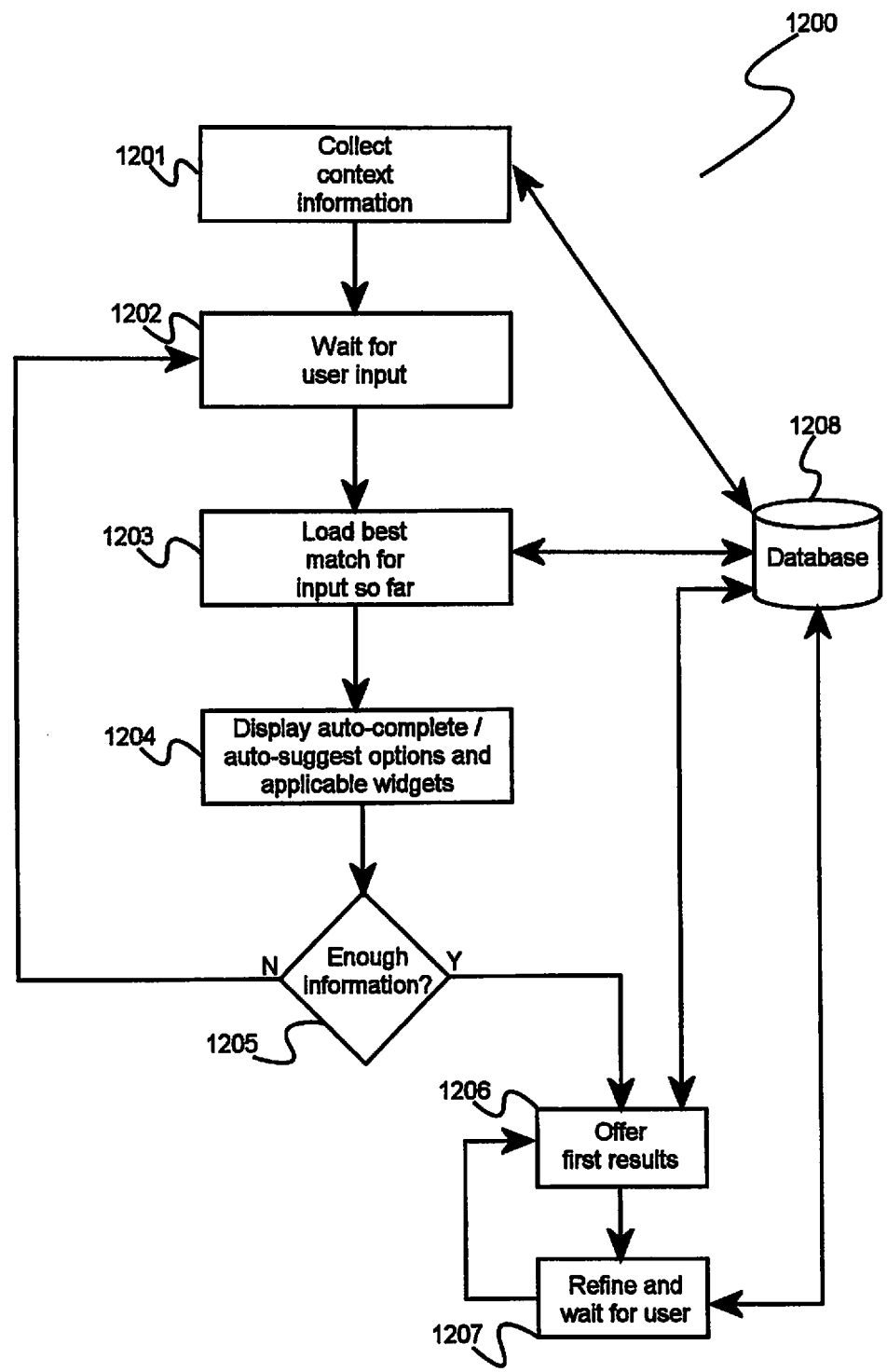
FIG. 12 is a method flow diagram, illustrating an exemplary process according to a preferred embodiment of the invention.

FIG. 12 shows an exemplary process 1200, according to one aspect of the system and method disclosed herein. Process 1200 follows the application running on the device, as described in the discussion of FIG. 11, above, and throughout. Said application can be a location application, it can be running locally in conjunction with a server, it can be running in a server displayed on a browser, or it can be running in a browser in conjunction with a server. For the purposes of the description of the system disclosed herein, all these approaches and any combination of these or similar approaches may be considered of equivalent functionality. In step 1201 the user initiates contact with the system, and the system pulls context information from data store 1208. This data store may be comprised of both local storage, such as, for example, cookies stored on the local device and other locally stored data, and of user profile information stored on the server, as well as additional information, such as location, extracted from, for example, GPS data and/or network connectivity location data. In step 1202 the system waits for input from the user. As soon as the user starts to type, in step 1203, the system loads the best match for the input so far, again, drawing from data store 1208. Such a match could be, for example, an auto-complete widget as is known from search engines today, or shopping sites that show what people typically would request. In step 1204 the system could display an auto-complete option or an auto-suggest option, and/or applicable widgets. Auto-complete and auto-suggest options differ, as described above in the discussion of FIG. 10. Auto-suggest options can, for example, make suggestions that go beyond the current scope of the search, adding things such as attributes, location, types, etc., to make the information supplied in response to the query more complete. These auto-complete and auto-suggest options may actually invoke one or more widgets that can attach themselves to the relevant section of text in the query box. In step 1205 the system checks to determine whether it has enough information to make an actual search and show results. If not (NO), the system cycles back to step 1202 and waits for more user input, which input could also include input from the various widgets that have popped up. If, in step 1205, the system determines that it has enough information (YES), in step 1206 the system populates an area below the query box with initial results. These results may be shown, for example, as items in a list or a dots on a map such that when the user touches on of the dots, additional information about the particular item is supplied. The shape and color of the dots, moreover, may impart sufficient information to the user so that he can make an initial selection of items of interests. Additionally, the system could display information riders such as cost, etc. Further, in some cases, for example, additionally, an indicia may indicate as soon as there's enough info for the query, further it may request the user to enter more, i.e. make the query even more specific, until the full template was entered. So in essence, step by step, the system may guide the user to fill in a complete template as required for a minimal response, and further offer additional requests to maximize the response value to user. For example the user may be shown an indicia, either with words or with colors, ranging from "mandatory" subsets (for example red when missing), "OK" (yellow) and "great query" (green) subsets and show these 3 different statii: "Not enough info" "Enough but please be more specific" "Specific query" The user can interactively refine the selection within the ontology presented in the template offered, or simply change order and the ontology follows by selecting another suitable template, and from there the system in step 1207 can cycle back to step 1206 to offer additional results, or it can load the final proposal.

It is clear that many modifications and variations of the system and method disclosed herein may be made by one skilled in the art without departing from the spirit of the novel art of this disclosure.

In some cases, a user seeking information, for example travel destinations, may enter a query into a query box, where a set of auto-complete and auto-suggest rules, based on a template derived from the initial user inputs and offered in the form of one or more widgets, is used to elicit a complete query from the user. These widgets may be in the form of combination widgets, text templates, auto suggest widgets and auto-complete widgets. If the user overwrites at least part of a word, a new template may apply, and new widgets may be launched. In cases where the number of results exceeds a certain threshold, the system may solicit additional information with further auto-suggest widgets. Further, the system may accept spoken user input by continuous speech recognition (word by word) with auto suggest templates and dynamic widgets on screen for faster completion, enabling the user to manually select responses. Additionally, an auto-complete widget may enable speech selections by the user, and the user may have the option to use speech to supply missing items in a template. Even though detailed exemplary description of travel destinations are discussed herein, nothing herein shall be viewed as limiting this approach to travel, it could be used for any kind of search, where templates can be made available, as well as widgets, auto complete and auto suggest can help the user achieve a complete query.

Also, in some cases, the initial template selection may start with context such as time of day, GPS location, way traveled recently etc. rather than user input to start with. Further, widgets maybe added and or removed dynamically, or in some cases under partial or full user control. IN some cases, the template may change when the user overwrites or changes selections, but certain types of changes may not be allowed, for example if the user wants to enter a town that is not contained in the dictionary. In this kind of situation, the user may be offered similar written or pronounced names from the dictionary, but not his "free style" entry, as the system would not be able to present meaningful results.

These modifications and variations do not depart from its broader spirit and scope, and the examples cited here are to be regarded in an illustrative rather than a restrictive sense.

Various embodiments of the present disclosure may be implemented in computer hardware, firmware, software, and/or combinations thereof. Methods of the present disclosure can be implemented via a computer program instructions stored on one or more non-transitory computer-readable storage devices for execution by a processor. Likewise, various processes (or portions thereof) of the present disclosure can be performed by a processor executing computer program instructions. Embodiments of the present disclosure may be implemented via one or more computer programs that are executable on a computer system including at least one processor coupled to receive data and instructions from, and to transmit data and instructions to, a data storage system, at least one input device, and at least one output device. Each computer program can be implemented in any suitable manner, including via a high-level procedural or object-oriented programming language and/or via assembly or machine language. Systems of the present disclosure may include, by way of example, both general and special purpose microprocessors which may retrieve instructions and data to and from various types of volatile and/or non-volatile memory. Computer systems operating in conjunction with the embodiments of the present disclosure may include one or more mass storage devices for storing data files, which may include: magnetic disks, such as internal hard disks and removable disks; magneto-optical disks; and optical disks. Storage devices suitable for tangibly embodying computer program instructions and data (also called the "non-transitory computer-readable storage media") include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

The skilled person will be aware of a range of possible modifications of the various embodiments described above. Accordingly, the present invention is defined by the claims and their equivalents.

What is claimed is:

1. An apparatus comprising:
    a user interface configured to enable a user to enter a query into a query box;
    a memory configured to store a first template including fixed natural language and at least one dynamic element, a second template including fixed natural language and at least one dynamic element, a plurality of auto-complete rules and a plurality of auto-suggest rules;
    a controller configured to select the first template or the second template based on an initial partial user input from the query box and configured to apply the plurality of auto-complete rules and the plurality of auto-suggest rules to generate a complete query,
    wherein the auto-suggest rules select alternative keywords by classification according to the selected first template or second template and the auto-complete rules select words to complete the initial partial input based on text characters;
    wherein auto-complete values for the plurality of auto-complete rules or auto-suggest values for the plurality of auto-suggest values are provided in the form of one or more widgets that offer a visual indicia receptive for user interaction.

2. The apparatus of claim 1, wherein a result of the complete query is predominantly travel related.

3. The apparatus of claim 2, wherein the one or more widgets include at least two of combination widgets, text templates, auto suggest widgets and auto-complete widgets.

4. The apparatus of claim 3, wherein when the user overwrites at least part of a word, a new template is selected, and accordingly at least one of the one or more widgets is re-launched to elicit further user input.

5. The apparatus of claim 1, wherein the controller is configured to compare a number of results to a predetermined threshold, and generate an additional widget for soliciting additional user input by offering additional information.

6. The apparatus of claim 1, wherein instead of typing, user input is provided by continuous speech recognition to the one or more widgets, enabling the user to manually select responses.

7. The apparatus of claim 5, wherein an auto-complete widget enables speech selections by the user.

8. A method comprising:
    displaying a user interface configured to enable a user to enter a query;
    storing a plurality of auto-complete rules and a plurality of auto-suggest rules;
    selecting a template from a plurality of templates based on an initial partial user input;
    applying the plurality of auto-complete rules and the plurality of auto-suggest rules to generate a complete query via the selected template, wherein the auto-suggest rules select alternative keywords by classification and the auto-complete rules suggest words to complete the initial partial input based on text characters;

wherein auto-complete values for the plurality of auto-complete rules or auto-suggest values for the plurality of auto-suggest values are provided in the form of one or more widgets that offer a visual indicia receptive for user interaction with the user interface.

9. The method of claim 8, wherein a result of the complete query is predominantly travel related.

10. The method of claim 9, wherein the one or more widgets include at least two of combination widgets, text templates, auto suggest widgets and auto-complete widgets.

11. The method of claim 10, wherein when the user overwrites at least part of a word, a new template is selected, and accordingly at least one of the one or more widgets may be re-launched to elicit further user input.

12. The method of claim 8, wherein the controller is configured to compare a number of results to a predetermined threshold, and generate an additional widget for soliciting additional user input by offering additional information.

13. The method of claim 8, wherein instead of typing, user input is provided by continuous speech recognition to the one or more widgets, enabling the user to manually select responses.

14. The method of claim 13, wherein an auto-complete widget enables speech selections by the user.

15. The method of claim 14, wherein an option is provided by the user interface to use speech to supply missing items in the selected template.

16. An apparatus comprising:
at least one processor; and
at least one memory including computer program code for one or more programs;
the at least one memory and the computer program code configured to, with the at least one processor, cause the apparatus to at least perform:
displaying a user interface configured to enable a user to enter a travel query;
storing an accommodation template, an activity template, a plurality of auto-complete rules and a plurality of auto-suggest rules;
receiving an initial partial user input;
selecting the accommodation template or the activity template based on the initial partial user input;
applying the plurality of auto-complete rules and the plurality of auto-suggest rules to generate a complete query,
wherein the auto-suggest rules select alternative keywords by classification and the auto-complete rules suggest words to complete the initial partial input based on text characters;
wherein auto-complete values for the plurality of auto-complete rules or auto-suggest values for the plurality of auto-suggest values are provided in the form of one or more widgets that offer a visual indicia receptive for user interaction with the user interface.

17. The apparatus of claim 16, wherein a result of the complete query is predominantly travel related.

18. The apparatus of claim 16, wherein the one or more widgets include a plurality of dialer menus.

* * * * *